United States Patent [19]

Choe et al.

[11] 4,245,084

[45] Jan. 13, 1981

[54] THERMOTROPIC, WHOLLY AROMATIC POLYTHIOLESTERS CAPABLE OF FORMING AN ANISOTROPIC MELT AND A PROCESS FOR PREPARING THE POLYTHIOLESTERS

[75] Inventors: Eui W. Choe, Randolph; Gordon W. Calundann, N. Plainfield, both of N.J.

[73] Assignee: Celanese Corporation, New York, N.Y.

[21] Appl. No.: 36,959

[22] Filed: May 7, 1979

[51] Int. Cl.³ .................. C08G 63/68; C08G 75/26
[52] U.S. Cl. .................. 528/293; 528/190; 528/192; 528/290; 528/298; 528/360
[58] Field of Search .............. 528/190, 192, 293, 298, 528/360, 290

[56] References Cited

U.S. PATENT DOCUMENTS

| | | | |
|---|---|---|---|
| 2,510,567 | 6/1950 | Flory | 528/364 |
| 2,970,168 | 1/1961 | Horn et al. | 528/360 |
| 3,254,061 | 5/1966 | Martin et al. | 528/364 |
| 3,705,882 | 12/1972 | Skillicorn | 528/362 |
| 4,067,852 | 1/1978 | Calundann | 260/9 |

*Primary Examiner*—Lucille M. Phynes
*Attorney, Agent, or Firm*—Kenneth A. Genoni

[57] ABSTRACT

Thermotropic, wholly aromatic polythiolesters exhibit an anisotropic melt. The polythiolesters may be prepared from monomers selected such that all or substantially all of the repeating groups are thiolester groups. Alternatively, the monomers can be selected such that sufficient thiolester groups are present to impart processability to a normally non-tractable polyester. Preparation of the polythiolesters is typically accomplished by melt polymerization of an esterified aromatic mercaptan compound, either alone or with other copolymerizable monomers. The polythiolesters may be melt processed into fibers, films or other types of shaped articles.

8 Claims, No Drawings

THERMOTROPIC, WHOLLY AROMATIC POLYTHIOLESTERS CAPABLE OF FORMING AN ANISOTROPIC MELT AND A PROCESS FOR PREPARING THE POLYTHIOLESTERS

BACKGROUND OF THE INVENTION

1. Summary of the Invention

This invention relates to thermotropic, wholly aromatic polythiolesters capable of forming an anisotropic melt and a process for preparing the polythiolesters.

2. Description of the Prior Art

It is well known in the art that a broad spectrum of polythiolesters can be prepared by reacting various ingredients. Thus, for example, in U.S. Pat. No. 2,510,567, polythiolesters are prepared by reacting dimercaptans with the acid chlorides of dibasic acids. Similarly, U.S. Pat. No. 2,870,126 describes a process of preparing polythiolesters by reacting organic dithiols with the acid chlorides of dibasic acids.

Linear polythiolesters are disclosed in U.S. Pat. No. 3,254,061. These polymers are obtained by reacting the phenyl esters of dicarboxylic acids with dimercaptans at elevated temperatures. The reaction liberates phenol which is removed from the reaction mixture. The resulting polymer can be melt extruded into fibers and then cold drawn and processed into high tenacity yarns.

Liquid thiolester-terminated polymers are described in U.S. Pat. No. 3,705,882. The thiolester polymers are prepared by reacting liquid mercaptan-terminated polymers with anhydrides, esters or carboxylic acids.

Although prior art of the type discussed above discloses various polythiolesters, the search has continued for high strength, high stability, polythiolesters which may be processed into superior fibers, films and other types of shaped articles. This invention was developed as a result of that search.

OBJECTS AND SUMMARY OF THE INVENTION

Accordingly, it is a general object of the present invention to obviate or substantially reduce the problems of the prior art.

It is a more specific object of the present invention to provide a thermotropic, wholly aromatic polythiolester capable of forming an anisotropic melt.

It is a further object of the present invention to provide a thermotropic, wholly aromatic polythiolester capable of forming an anisotropic melt which may be melt processed into fibers, films and other types of shaped articles.

It is a still further object of the present invention to provide a process for preparing a thermotropic, wholly aromatic polythiolester capable of forming an anisotropic melt.

These and other objects, as well as the scope, nature and utilization of the invention will be apparent to those of ordinary skill in the art from the following summary and detailed description of the preferred embodiments.

In one aspect, the present invention relates to a thermotropic, wholly aromatic polythiolester capable of forming an anisotropic melt. The polythiolester is comprised of a recurring unit selected from the group consisting of:

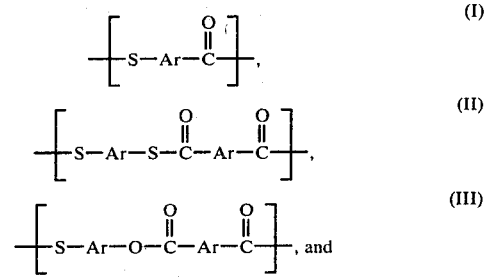

(IV) mixtures thereof,
wherein Ar is unsubstituted or substituted aromatic moieties selected from the group consisting of:

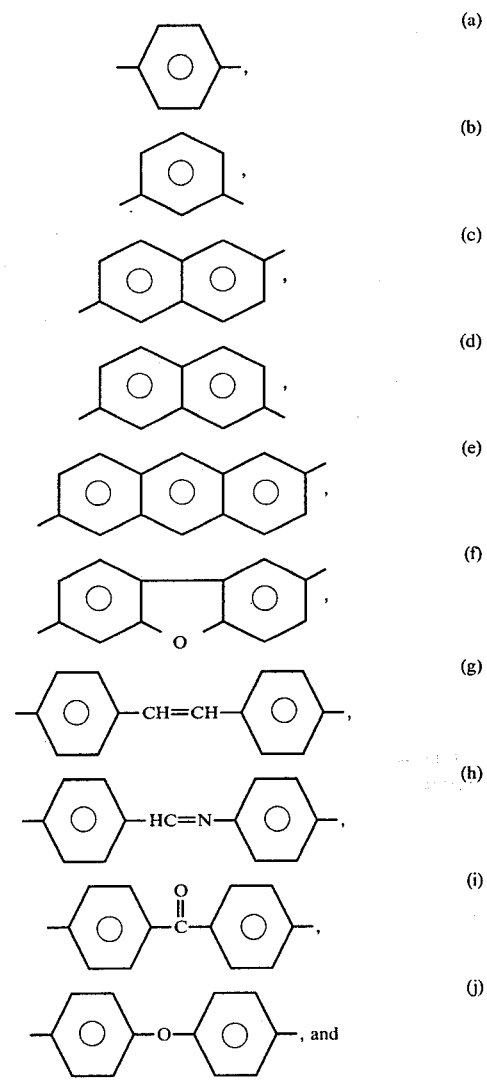

(k) mixtures thereof.

In another aspect, the present invention relates to a thermotropic, wholly aromatic polythiolester capable of forming an anisotropic melt. The polythiolester is comprised of recurring units selected from the group consisting of:

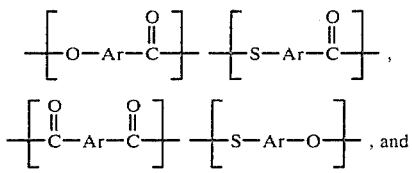

(III) mixtures thereof,
wherein Ar has the aforementioned definition.

In a further aspect, the present invention relates to a process for preparing the thermotropic, wholly aromatic polythiolester capable of forming an anisotropic melt.

DESCRIPTION OF THE PREFERRED EMBODIMENTS

As stated above, the present invention relates to thermotropic, wholly aromatic polythiolesters capable of forming an anisotropic melt. The polythiolesters may be derived from monomers selected such that all or substantially all of the repeating groups are thiolester groups. As used herein, the term "all or substantially all" is meant to include those polythiolesters which are prepared from a reaction mixture having from about 20 to 100 mole percent based on the total moles of monomers present. The remaining proportion of monomers may yield other repeating groups such as ester or carbonate groups. It is to be understood, however, that the proportion and type of comonomer should be selected so as to not substantially adversely affect the characteristics of the polythiolester.

In this embodiment of the invention, the polythiolester is comprised of a recurring unit selected from the group consisting of:

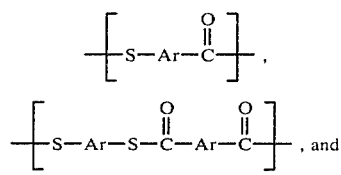

(III) mixtures thereof,
wherein Ar is unsubstituted or substituted aromatic moities selected from the group consisting of:

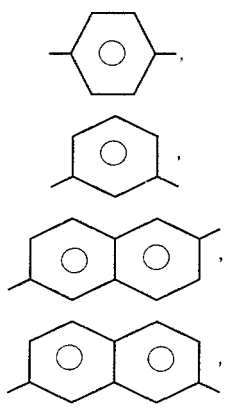

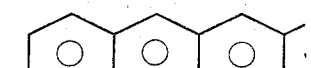

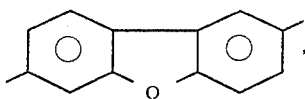

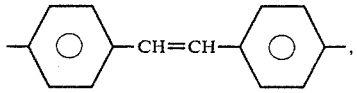

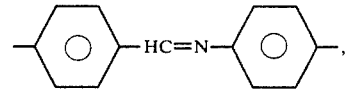

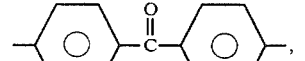

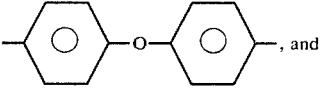

(k) mixtures thereof.

Substituents on the aromatic ring include halogen atoms, lower alkyl groups, lower alkoxy groups and phenyl groups. However, in all instances, the type and amount of substituents should be selected so as to not substantially adversely affect the characteristics of the polythiolester.

Alternatively, the polythiolester may be prepared by adding a thiolester forming aromatic monomer to a reaction mixture which would normally form a non-tractable (i.e., non-melt processable), wholly aromatic polyester. The presence of a sufficient proportion of the thiolester groups enables the polymer to be processed into the desired shaped articles such as fibers. Although the proportion of thiolester groups necessary to obtain processability may vary according to the specific polyester and thiolester forming components, typically from about 10 to about 30 mole percent, preferably from about 15 to about 25 mole percent, based on the total number of moles present, of a thiolester forming monomer is added to the normally non-tractable, wholly aromatic polyester reaction mixture. Such normally non-tractable polyesters are characterized by high melting temperatures or a melting temperature above its decomposition temperature. Thus, for example, normally non-tractable p-hydroxybenzoic acid homopolymers may be rendered melt processable by adding from about 10 to about 30 mole percent of an acetylated 2,6-naphthalene mercaptan compound to the reaction mixture.

The improved processability of the normally non-tractable polyester is believed to be caused by the coplanar configuration of the thiolester and aryl groups which increases the nematic stability of the polymer. Additionally, the thiolester groups are capable of closer or tighter packing of polymer molecules (i.e., closer internuclear distance) and possess stronger hydrogen bonding characteristics.

The polythiolester is comprised of recurring random units selected from the group consisting of:

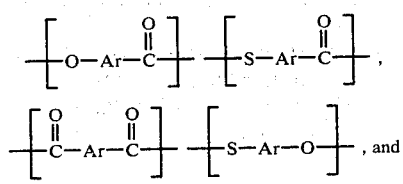

(III) mixtures thereof, wherein Ar has the aforementioned definition.

The thiolester polymers of the present invention may be used to form fibers, films or other types of shaped articles. Tire cords produced from the polythiolesters exhibit particularly advantageous properties inasmuch as the thiolester groups exhibit improved hydrolytic and thermal stability when compared to their polyester counterparts. This characteristic results in safer, stronger, longer wearing tires.

Preparation of the polythiolesters is preferably accomplished by the melt polymerization of the esterified, particularly acetylated, derivatives of the desired aromatic mercaptan compounds, either alone or with copolymerizable monomers. Esterification of the hydroxy and mercapto groups enables the monomers of the reaction mixture to obtain thermoxidative stability at the higher temperatures required for polymerization.

Typical aromatic mercaptan compounds that may be employed in the present invention are represented by the general formulas:

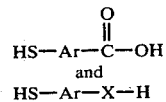

wherein Ar has the aforementioned definition and X is S or O.

Esterification of the mercapto compound may be performed in any manner known to those of ordinary skill in the art. Thus, for example, acidified acetic anhydride can be mixed with the mercapto compound, the mixture heated for several hours and then allowed to cool. To recover the acetylated product, the mixture is precipitated in water, filtered, and recrystallized. Alternatively, acetylation may be accomplished by the techniques described in U.S. patent application Ser. No. 17,007 filed on Mar. 2, 1979 to Larry Francis Charbonneau, entitled "Thermotropic Polyesters Derived from Ferulic Acid and a Process for Preparing the Polyesters", the content of which is incorporated by reference.

The acetylated aromatic mercaptan compounds are illustrated by the following specific monomers:

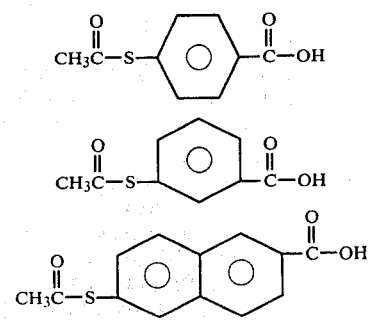

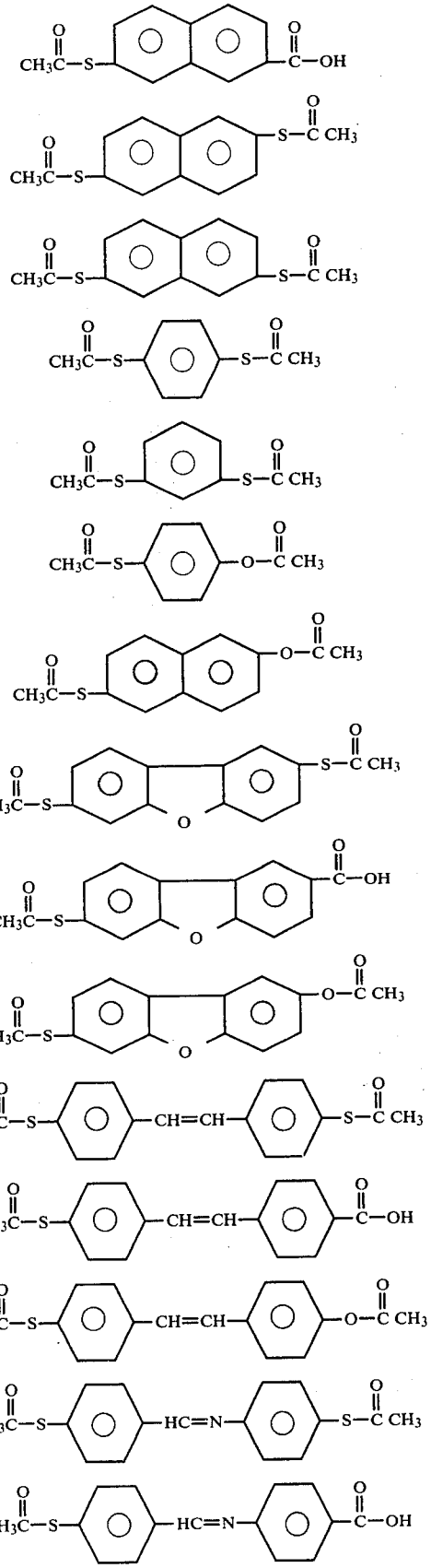

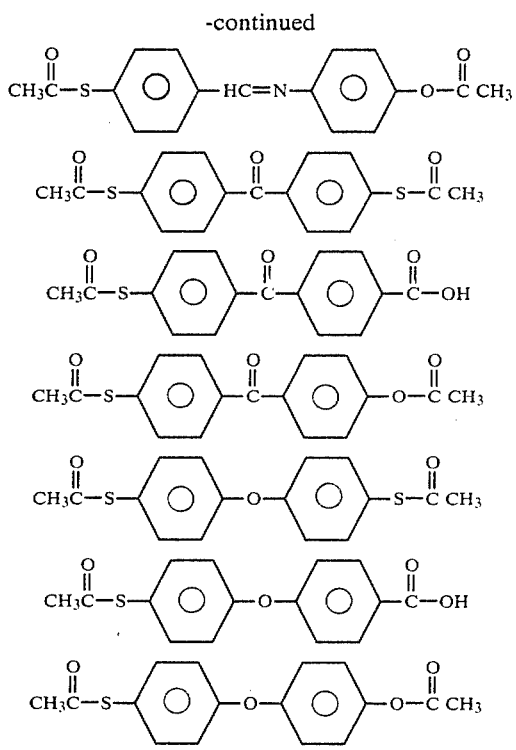

As stated above, the polythiolesters are preferably prepared by melt polymerization of the esterified monomers. Melt polymerization is typically carried out by placing the required molar amounts of the monomers in a vessel equipped with an agitator, a water separator and a condenser. Additionally, up to about 5% by weight of acetic anhydride or sodium acetate may be added to ensure acetylation of the hydroxy or mercapto groups. To substantially exclude the presence of oxygen, which will tend to inhibit the polymerization reaction, the vessel usually has an inlet and an outlet for nitrogen or other inert gas.

After the vessel is sealed, the reaction mixture is heated for from about 2 to about 6 hours, preferably for from about 2 to about 4 hours, at a temperature ranging from about 240° to about 340° C., preferably from about 250° to about 320° C. and at about ambient pressure. To inhibit sublimation of the reactants, it is generally desirable to gradually raise the temperature of the reaction mixture, either incrementally or continuously, throughout the polymerization reaction.

Toward the end of the reaction period, the vessel is gradually evacuated over a period of from about 10 to about 30 minutes to a pressure of from about ambient pressure to about 1.0 mm. Hg. to remove acetic acid (if acetylated monomers are used) formed during the polymerization reaction. During this time, the reaction mixture is maintained at a temperature of from about 300° to about 325° C.

Although not essential to the polymerization reaction, up to about 1.0% by weight of conventional catalyst may be initially added to the reaction mixture to improve the rate of reaction and the polymer yield. Such catalysts are represented by potassium acetate.

Recovery of the polythiolester is performed by simply cooling the reaction mixture to about room temperature and removing the polythiolester from the vessel.

The polymerization process may be operated on a continuous, semi-continuous or, preferably, on a batch basis.

The prepared polythiolester is capable of forming an anisotropic melt (i.e., forms liquid crystals). Anisotropy can be confirmed by standard polarized light techniques whereby cross-polarizers are employed, generally in conjunction with a hot-stage microscope.

Although wide variations in melting temperature may occur depending on the type and amount of the constituents used in the preparation of the polythiolester, it generally ranges from about 250° to about 340° C., as determined by a Differential Scanning Calorimeter at 20° C. per minute. Based on similar considerations, the formed polythiolester has an inherent viscosity of from about 1.0 to about 5.0 dl./g. when measured as a 0.1% by weight solution in pentafluorophenol at 60° C.

To form fibers, films or other shaped articles, the polythiolester of the present invention is typically melt processed by conventional techniques such as melt spinning, pressure molding and extrusion. These materials are generally characterized by their excellent strength and resistance to degradation. However, to further improve their properties, conventional after treatment techniques, such as heat treating, may be employed. Where desired, one or more known fillers (e.g., pigments, extenders, etc.,) and/or reinforcing agents can be added to the polythiolester during melt processing. Thus, where fibers or films are prepared, the amount of such optional additives may range from about 1 to about 10% by weight of the total mixture. Similarly, where molded articles are prepared, the amount of the additives may range from about 5 to about 30% by weight. Exemplary fillers and reinforcing agents are set forth in U.S. Pat. No. 4,067,852, the content of which is incorporated by reference.

The following Examples are given as a specific illustration of the process. It is to be understood, however, that the invention is not limited to the specific details set forth in the Examples.

EXAMPLE 1

Preparation of 4-mercaptophenol diacetate 126.17 grams (1 mole) of p-mercaptophenol is added into 714.6 grams of acetic anhydride with 5 cc. of sulfuric acid. After the resulting mixture is heated at 100° C. for 2 hours, it is allowed to cool and is poured into 3 l. of water in order to precipitate the product. The solid is filtered, recrystallized from 3.5 l. of hexane and dried overnight at 100° C. to yield 198.5 grams of 4-mercaptophenol diacetate which has a melting range of 73–75° C.

Preparation and Spinning of Polythiolester

In a 300 ml. three-necked round bottom flask equipped with a mechanical stirrer, nitrogen inlet and outlet, a Dean-Stark water separator and condenser, is placed 54.048 grams (0.3 moles) of p-acetoxybenzoic acid, 10.809 grams (0.05 moles) of 2,6-naphthalenedicarboxylic acid, 8.306 grams (0.05 moles) of isophthalic acid, 21.025 grams (0.1 moles) of p-mercaptophenol diacetate and 3 ml. of acetic anhydride. The resulting mixture is heated under nitrogen at 250° C. for 2 hours, 280° C. for one hour, and finally at 320° C. for one hour under a reduced pressure of 1.0 mm. Hg. After the melt is cooled, the product is collected, and ground to yield 54.35 grams of polythiolester having an inherent viscosity of 2.7 dl./g. when measured as a 0.1% solution in pentafluorophenol at 60° C. The polythiolester melt is anisotropic at 280–300° C. between crossed polarizers.

The polymer is compressed to form a rod at 180° C. for 3 minutes, is placed in a micro-melt spinning unit, and is spun into air through a 0.020×0.100 inch spinnerette at 270°–301° C. The fibers are wound up at 150 meters per minute. The fiber, as spun at 281° C. has a tenacity of 7.16 grams per denier, an elongation of 2.42 and a modulus of 405 grams per denier. X-Ray analysis confirms that the fibers have obtained a high degree of orientation. The fiber is subjected to heating in order to yield improved fiber properties.

EXAMPLE 2

Preparation for the Acetate of p-thiolbenzoic Acid

Forty-eight grams of zinc and 200 ml. of concentrated hydrochloric acid is slowly added in small quantities at intervals into a hot solution of 25 grams of p-(chlorosulfonyl)benzoic acid in 100 ml. of acetic acid. White solid separates out after 2 hours. Concentrated hydrochloric acid is added to dissolve excess zinc. The crude product is filtered and purified to yield 8 grams of light yellow, p-thiolbenzoic acid with a melting point of 220° C. as determined by a Differential Scanning Calorimeter at 20° C. per minute. After the mixture of p-thiolbenzoic acid and acetic anhydride is heated for 2 hours at 100° C. with a drop of concentrated sulfuric acid, the resulting mixture is poured onto ice. A gummy material separates and is allowed to solidify at room temperature. The solid is filtered, washed with water and dried to obtain a quantitative yield of the acetate of p-thiolbenzoic acid with a solid to solid phase transition at 198° C. and solid to isotropic phase transition at 225° C. NMR analyses are satisfactory for both p-thiolbenzoic acid and its acetate derivative.

Preparation and Spinning of Polythiolester

An equimolar amount of the acetate of p-thiolbenzoic acid, as prepared above, may be substituted for the p-acetoxybenzoic acid employed in Example 1. Under similar reaction conditions, a polymer exhibiting consistent characteristics is obtained.

Although the invention has been described with preferred embodiments, it is to be understood that variations and modifications may be resorted to as will be apparent to those skilled in this art. Such variations are to be considered within the scope of the following claims.

We claim:

1. A thermotropic, wholly aromatic polythiolester capable of forming an anisotropic melt, said polythiolester being comprised of a recurring unit selected from the group consisting of:

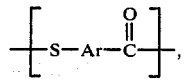   I

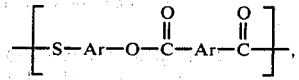   II mixtures of I and II,   III mixtures of at least one of I or II and   IV

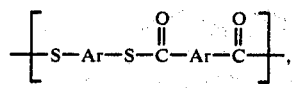

III mixtures of I and II,

IV mixtures of at least one of I or II and wherein Ar is unsubstituted or substituted aromatic moieties selected from the group consisting of:

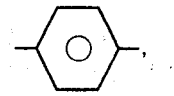   (a)

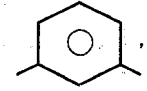   (b)

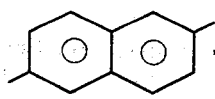   (c)

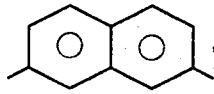   (d)

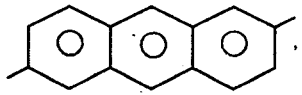   (e)

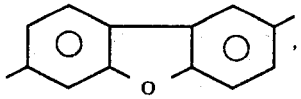   (f)

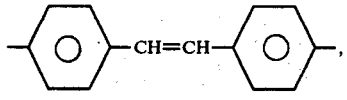   (g)

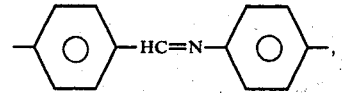   (h)

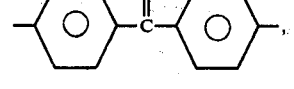   (i)

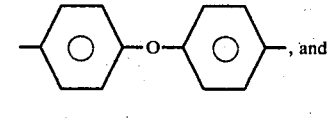   (j)

, and (k) mixtures thereof.

2. The polythiolester of claim 1 wherein Ar is selected from the group consisting of:

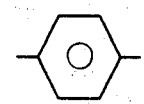   (a)

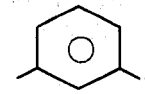   (b)

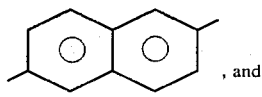, and (d) mixtures thereof.

3. A thermotropic, wholly aromatic polythiolester capable of forming an anisotropic melt, said polythiolester being tractable and being comprised of recurring units selected from the group consisting of:

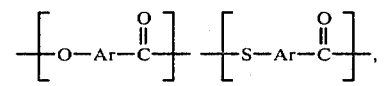  I

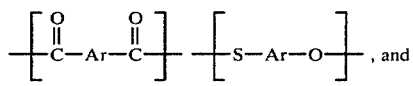, and  II

III mixtures thereof, wherein Ar is unsubstituted or substituted aromatic moieties selected from the group consisting of:

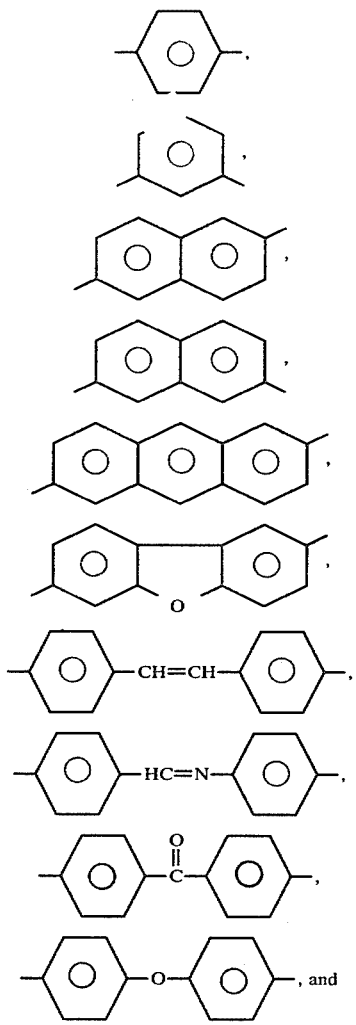

(k) mixtures thereof.

4. A process for preparing a thermotropic, wholly aromatic polythiolester capable of forming an anisotropic melt comprising:

(a) esterifying at least one aromatic mercapto compound selected from the group consisting of:

and

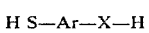

wherein X is S or O and Ar is selected from the group consisting of:

 (1)

 (2)

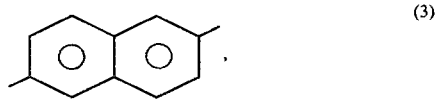 (3)

 (4)

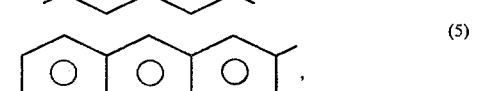 (5)

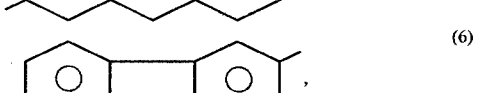 (6)

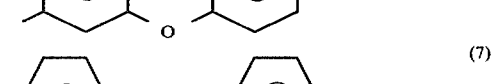 (7)

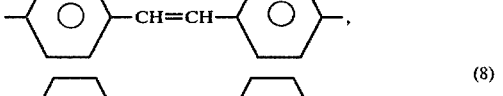 (8)

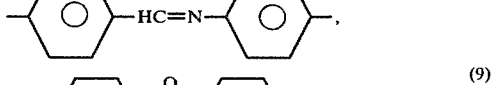 (9)

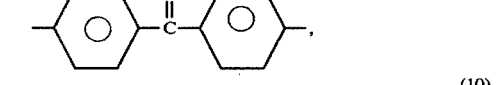, and (10)

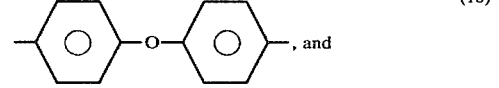

(11) mixtures thereof, (b) heating the esterified compound to a temperature of from about 240° to about 340° C. for from about 2 to about 6 hours;

(c) reducing the ambient pressure to from about ambient pressure to about 1.0 mm. Hg. for from about 10 to about 30 minutes, while maintaining the reaction temperature in the range of from about 300° to about 325° C.; and (d) recovering the polythiolester.

5. The process of claim 4 wherein the aromatic mercapto compound is initially acetylated.

6. The process of claim 5 wherein steps (b), (c), and (d) are performed in the substantial absence of oxygen.

7. The process of claim 6 wherein the acetylated aromatic mercapto compound is present in an amount ranging from about 10 to about 30 mole %, based on the total number of moles present, and the balance is comprised of monomers which form a normally non-tractable polyester.

8. The process of claim 7 wherein the acetylated aromatic mercapto compound is 4-mercaptophenol diacetate and the polyester forming monomer is p-hydroxy-benzoic acid.

* * * * *

UNITED STATES PATENT AND TRADEMARK OFFICE
CERTIFICATE OF CORRECTION

PATENT NO. : 4,245,084
DATED : January 13, 1981
INVENTOR(S) : EUI W. CHOE and GORDON W. CALUNDANN It is certified that error appears in the above-identified patent and that said Letters Patent are hereby corrected as shown below:

IN THE CLAIMS:

Claim 1, Column 10, delete lines 7 and 8, which read as follows:

--III mixtures of I and II,

IV mixtures of at least one of I or II and--.

Signed and Sealed this

Fourteenth Day of April 1981

[SEAL]

Attest:

RENE D. TEGTMEYER

Attesting Officer    Acting Commissioner of Patents and Trademarks